United States Patent [19]
Schnur

[11] 3,979,961
[45] Sept. 14, 1976

[54] METHOD AND APPARATUS FOR PROPELLING AN OBJECT BY AN UNBALANCED CENTRIFUGAL FORCE WITH CONTINUOUS MOTION

[76] Inventor: Nicholas Joseph Schnur, 704 St. Agnes Lane, West Mifflin, Pa. 15122

[22] Filed: Mar. 11, 1974

[21] Appl. No.: 450,060

[52] U.S. Cl. .............................. 74/61; 259/DIG. 43
[51] Int. Cl.² ......................................... F16H 21/40
[58] Field of Search .............. 74/61, 574, 64; 233/7; 259/DIG. 43

[56] References Cited
UNITED STATES PATENTS

| | | | |
|---|---|---|---|
| 3,092,582 | 6/1963 | Lacker | 233/7 |
| 3,187,604 | 6/1965 | Hazel | 74/574 |
| 3,559,879 | 2/1971 | Bechard | 233/7 |
| 3,584,515 | 6/1971 | Matyas | 74/84 S |

*Primary Examiner*—Samuel Scott
*Assistant Examiner*—Wesley S. Ratliff, Jr.
*Attorney, Agent, or Firm*—Carothers and Carothers

[57] ABSTRACT

A continuous motion propulsion apparatus wherein a quantity of liquid is rotated within an annular housing to centrifugally distribute the liquid thereabout in an annular channel. A deflection device is mounted within the housing and deflects the liquid inwardly from the annular channel at a predetermined position relative to an outside reference thereby creating an unbalanced centrifugal force which unidirectionally propels the apparatus with continuous motion.

9 Claims, 5 Drawing Figures

METHOD AND APPARATUS FOR PROPELLING AN OBJECT BY AN UNBALANCED CENTRIFUGAL FORCE WITH CONTINUOUS MOTION

BACKGROUND OF THE INVENTION

1. Field of the Invention

The present invention relates generally to propulsion apparatus, and more particularly to propulsion apparatus which utilize unbalanced centrifugal forces to achieve unidirectional movement of an object.

2. Description of the Prior Art

A number of propulsion apparatus utilizing the principal of an unbalanced centrifugal force have been employed in the past. However, they are all constructed such that they create intermittent motion as opposed to continuous motion, and they are mechanically complex and inefficient thereby rendering them relatively expensive to manufacture and operate.

The prior art suggests that such unidirectional propulsion apparatus utilizing unbalanced centrifugal forces can be used to move objects on the land, water or in the air. While this is true, probably one of the most important possible applications is in conjunction with the acceleration of space vehicles which are out of the influence of the earth's gravitational pull, as such propulsion apparatus are otherwise relatively inefficient when used under the influence of the earth's gravity.

At present, space vehicles travelling between planets and which are not under the influence of the earth's gravity have been able to achieve only speeds of between 31,000 and 32,000 miles per hour. To achieve greater speeds would require the craft to carry considerable extra quantities of fuel, which is impractical. Accordingly, the use of a simple propulsion apparatus utilizing the principles of an unbalanced centrifugal force which is driven by solar energy becomes appealing under such conditions in order to continually accelerate the space craft when it is under minimal gravitational influences.

Probably the simplest form of propulsion apparatus which does not propel itself by a force acting against an external medium, such as land, water or air, but is rather propelled by a reaction created internally within the apparatus itself is the direct push propulsion unit of Llamozas described in U.S. Pat. No. 2,636,340. Llamozas discloses a propulsion apparatus which consists of a piston slidably received within a closed cylinder which has no ingress or egress. The piston is caused to extend into the cylinder thereby compressing the air contained therein to a small volume, at which point the force holding the piston is released allowing the piston to be propelled within the cylinder due to the force exerted thereon by the compressed gas. The reaction of the cylinder working against the piston of heavier mass thus causes the cylinder to be propelled in a direction opposite to the direction of movement of the piston.

However, such a device, while being functional, is relatively inefficient and in addition propels the apparatus with rough intermittent motion instead of a smooth flowing continuous motion.

Instead of using unbalanced unidirectional forces as taught by Llamozas for propelling an object, a number of propulsion apparatus were developed which utilized an unbalanced centrifugal force, which in essence utilized the same basic principles as Llamozas, but permits the use of a plurality of propelling devices within the single apparatus instead of one propulsion mechanism alone. For example, see Laskowitz, U.S. Pat. No. 1,953,964, which utilizes an annular series of interconnected weights placed on radial arms which are eccentrically rotated about a common axis within a housing thereby creating an unbalanced centrifugal force imparting a unidirectional thrust to the housing. While Laskowitz does not use a compressed gas as taught by Llamozas, nevertheless the same principles are involved in that propulsion is created due to unbalanced forces set up within the unit or apparatus itself.

Other examples of such propulsion apparatus utilizing an unbalanced centrifugal force are illustrated in Great Britain Pat. No. 770,555 issued to Andrew Reid II and U.S. Pat. No. 3,555,915 issued to H. W. Young, Jr.

However, each of these apparatus is relatively mechanically complex in that a relatively large number of mechanically moveable parts is required and they are also relatively inefficient due to the losses created by excessive mechanical friction between mechanical parts. In addition, the propulsion motion created by these apparatus in nevertheless intermittent, even though their overall motion may be smoother than that experienced from the Llamozas apparatus, thereby adding to the inefficiency and causing undesirable vibrations to be imparted to the object being propelled.

U.S. Pat. No. 3,584,515 issued to Laszlo B. Matyas discloses a propulsion apparatus which also utilizes an unbalanced centrifugal force. Matyas discloses a propulsion apparatus which contains a central mass of liquid having a relatively high specific gravity, such as mercury, and provides an annular series of a large number of pistons which unitarily rotate about an axis with the mercury confined therebetween, and the pistons are cyclically operated to continually force the liquid from one side of the axis of rotation to the other thereby creating an unbalanced centrifugal force.

It can be noted from studying this particular structure that it is mechanically very complex and would therefore be relatively expensive to manufacture and would likely have a relatively high rate of failure as compared to the other prior art propulsion devices.

While the large number of pistons provided in an annular array in the Matyas disclosure does tend to smooth out the propulsion motion of the apparatus, nevertheless, the motion is still somewhat intermittent as opposed to being continuous.

It is the principal object of the present invention to eliminate the aforementioned disadvantages of the prior art propulsion devices and to provide a propulsion apparatus which operates on the principal of utilizing an unbalanced centrifugal force to obtain unidirectional motion which is continuous as opposed to being intermittent, and which in addition is mechanically simpler and more efficient than the apparatus of the prior art.

SUMMARY OF THE INVENTION

The continuous motion propulsion apparatus of the present invention generally comprises a moveable frame which rotatably supports an annular channel means which rotates in a plane perpendicular to its axis of rotation about its center. A body of liquid is contained within the channel means which is rotated about its axis to centrifugally distribute the liquid annularly therein. A deflection means is positioned in the annular channel means to deflect the liquid contained therein inwardly at a predetermined position relative to an outside reference to create an unbalanced centrifugal force and thereby propel the apparatus with continuous motion.

The annular channel means is generally provided within a closed housing in which the liquid, which is preferably of a relatively high specific gravity such as mercury, is housed, and the housing is supported for rotation on a shaft.

The deflection means or deflector depends radially outward from the shaft within the housing, and may physically be constructed in a number of different manners. In its simplest form, the deflector may consist of nothing more than a deflector surface which is rigidly secured to the shaft inside the housing and which has a leading edge penetrating outwardly into the channel containing the liquid to be deflected inwardly.

In a second form, the deflector may take on the configuration of an annular concave disc which is rotatably mounted at its center on the shaft within the housing. In this configuration, the shaft is shaped out of axial and parallel alignment with the axis of rotation of the housing at the point where the shaft rotatably supports the disc such that the perimetral portion of the disc which is permitted to penetrate into the channel containing the liquid to be deflected is deflected inwardly by the scooping action of the concave disc edge at the points of contact therewith.

This configuration is preferable over the aforementioned deflector which is rigidly secured to the shaft, as in this configuration the concave disc is permitted to rotate with the housing and the body of liquid being centrifugally rotated therewith, thereby reducing the friction of the scooping action caused by penetration of the deflector into the rotating centrifugally formed annular band or body of liquid. In this configuration, it is preferable to provide two such discs facing each other in opposition to balance the internal deflection forces.

In addition, it may be desirable to assist the disc in its rotation by actually positively driving the same with a gear train arrangement between the rotating housing and the deflection discs.

A better understanding of the operation of these different embodiments will become more apparent with a study of the following disclosure.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENTS

Figure 1:
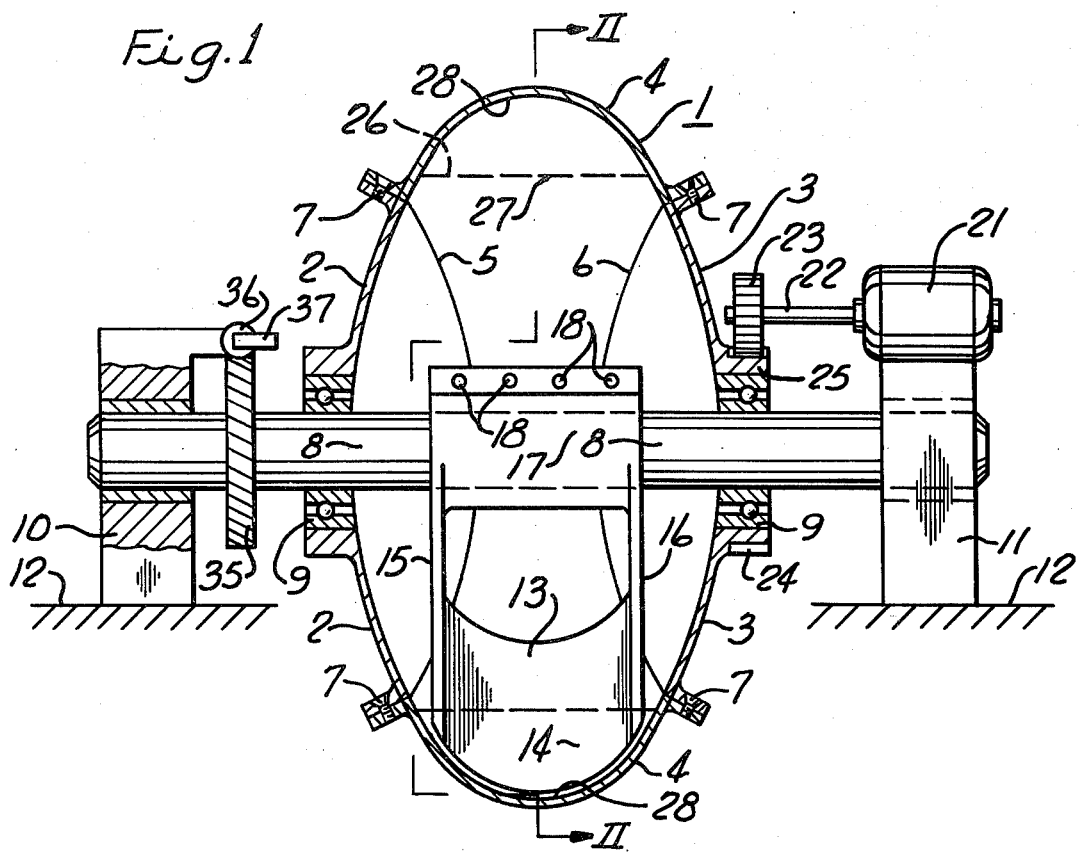
FIG. 1 is a simplified view in front elevation in partial section of one embodiment of the propulsion apparatus according to the present invention, as seen along line I—I of FIG. 2.
Figure 2:
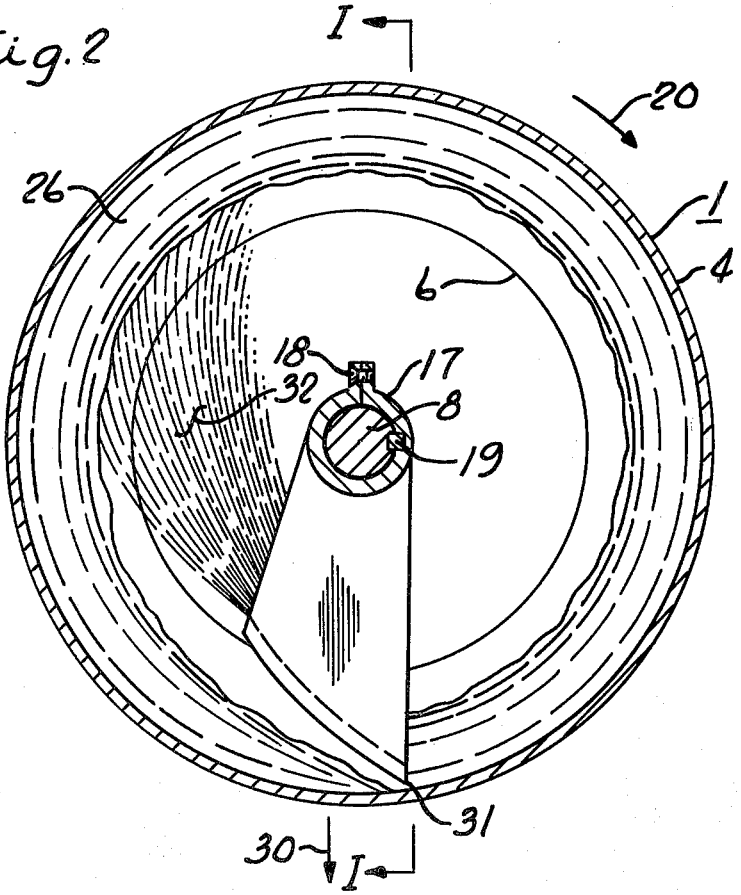
FIG. 2 is a sectional view in side elevation of the apparatus illustrated in FIG. 1 as seen along line II—II.

Referring to FIGS. 1 and 2, the simplest embodiment of the propulsion apparatus according to the teachings of the present invention is illustrated. The propulsion apparatus consists of a closed housing 1 which is made up of three separate housing parts which join together to form the integral housing 1. These parts consist of the housing ends 2 and 3, which are joined to the center annular housing member 4 as indicated along the respective joining seams 5 and 6 which are maintained in a sealed engagement by means of machine screws 7.

Housing 1 is supported for rotation on stationary shaft 8 by means of ball bearing races 9 which is, in turn, supported at its ends by supports 10 and 11, which are secured to the object or body to be propelled or accelerated generally indicated at 12.

Within the housing 1, the deflector 13 is supported from the stationary shaft 8. The deflector 13 consists of the liquid deflection surface 14 supported by arms 15 and 16 which in turn are supported from the sleeve coupling or clamp 17, which rigidly clamps and engages stationary shaft 8 by means of clamp screws 18. If desired, in addition, clamp 17 may also be keyed to shaft 8 as indicated at 19 to prevent slippage therebetween.

The housing 1 is rotated on shaft 8 in the direction as indicated by arrow 20 in FIG. 2, by means of motor 21 rigidly mounted on support 11 which drives housing 1 through motor shaft 22 and gear 23 which meshes with gear 24 that is integral with hub 25 of the housing section 3, which in turn contains ball bearing race 9.

The motor 21 may, of course, be selected to operate from any number of different types of energy sources, such as hydraulic or electric; however, if the apparatus is to be employed in spacecraft, then it is preferable that the motor 21 be electric and operated from solar energy.

A liquid 26, preferably one of relatively high specific gravity such as mercury, is contained within housing 1 as positively illustrated in FIG. 2 and hypothetically illustrated by means of the dashed lines 27 in FIG. 1.

The housing 1 is rotated at a sufficient rate by motor 21 to centrifugally distribute the liquid 26 about the annualr channel 28 formed within the center housing portion 4 of housing 1. As a result, the liquid 26 retained in channel 28 is deflected by deflection surface 14 from the annular channel inwardly as best illustrated in FIG. 2 thereby unbalancing the otherwise balanced centrifugal forces of the centrifugally distributed liquid 26. This continuous unbalancing of the centrifugal force creates a continuous motion unilateral thrust of the entire apparatus in the direction generally indicated by arrow 30. Upon viewing the disclosure, it becomes obvious that the motion created is, in fact, continuous as opposed to being of the intermittent type disclosed by the prior art previously described.

The deflector 13 is provided with a sharp edge 31 at its forward end to reduce the frictional engagement between the deflector surface 14 and the liquid 26 as much as possible. The liquid 26 is literally scooped out of channel 28 by deflection surface 14 and directed inwardly and then permitted to return back to the channel 28 as generally indicated by the flying or sprayed liquid particles indicated at 32.

It can be seen that if one desires to change the direction of thrust of the apparatus, one need merely change the position of the deflection surface 14 relative to the rotating housing by rotating normally stationary shaft 8 to position the deflector 13 at the desired position relative to an outside reference toward which motion of the apparatus is to be directed.

Position changes of normally stationary shaft 8 are accomplished by means of the ring gear 35 which is keyed to shaft 8 and in turn may be rotated along with the shaft 8 by means of the worm gear drive 36 which is manually manipulated by means of handle 37. Worm gear drive 36 is, in turn, supported from end support 10.

Shaft 8 is received in simple sleeve bearings within supports 10 and 11 to permit these minor variations in position change for the deflector 13.

Figure 3:
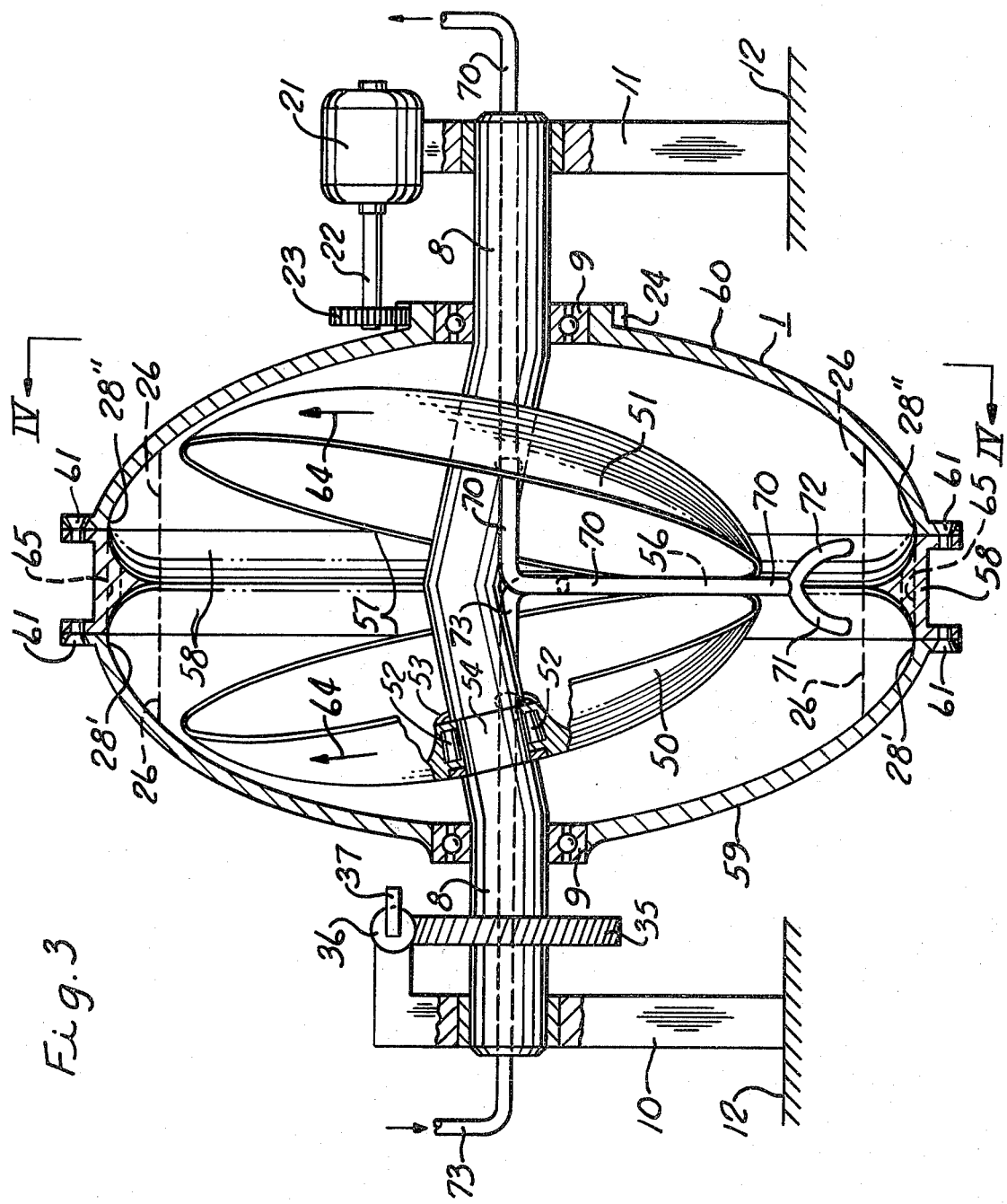
FIG. 3 is a simplified view in side elevation in partial section of another embodiment of the propulsion apparatus of the present invention, as seen along line III—III of FIG. 4.
Figure 4:
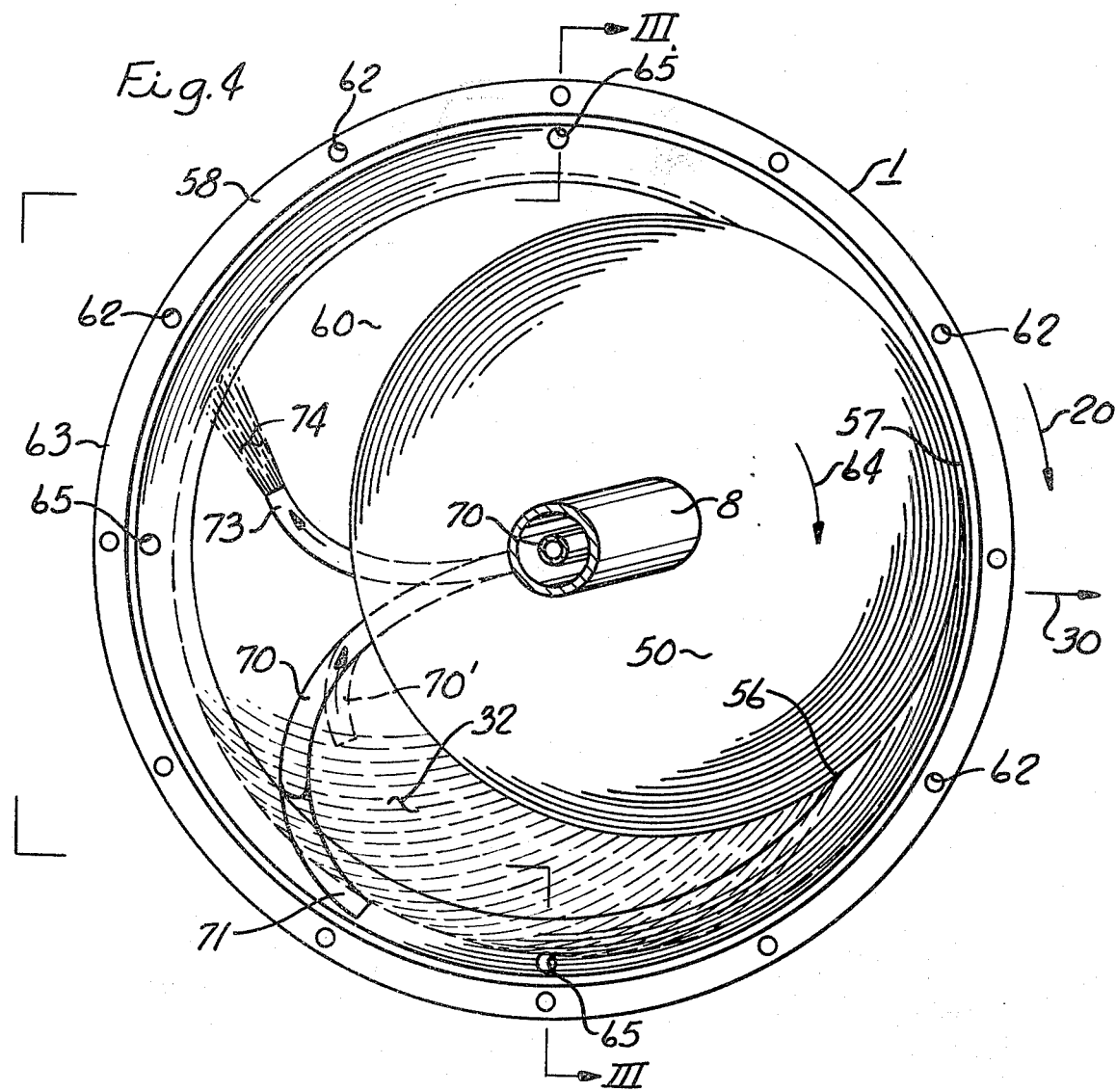
FIG. 4 is a view in side elevation as seen in section along line IV—IV of FIG. 3 with the right side of the housing illustrated in FIG. 3 removed.

Referring next to FIGS. 3 and 4, elements in these figures which are substantially identical to those disclosed in FIGS. 1 and 2 are designated with the same reference numerals. The primary distinction between the embodiment of FIGS. 3 and 4 from the embodiment of FIGS. 1 and 2 is the type of deflector employed to scoop up or deflect the liquid inwardly from the outer annular channels where it is centrifugally retained.

In the embodiment of FIGS. 3 and 4, the deflectors 50 and 51 are in the form of opposed concave annular discs respectively, which are mounted for rotation on shaft 8 by means of roller bearings 52 received in the hub 53 of each disc. Roller bearings 52 are seated on a restricted portion 54 of shaft 8 which is a section of shaft 8 having a reduced diameter in order to confine the position of deflection discs 50 and 51 thereby preventing them from moving axially along the shaft 8.

It should be noted that the axis of rotation of deflection discs 50 and 51 are out of parallel and axial alignment with each other and also with the axis of rotation of the housing 1 such that the deflection discs 50 and 51 perimetrally converge toward each other at one point 56, which is fixed relative to shaft 8 and in addition permits the discs to penetrate into the centrifugally distributed liquid 26 along perimetral portions of the discs which pass through point 57 as illustrated in FIG. 4. When the discs 50 and 51 are disposed in this manner, they have a scooping action at their perimetral portions passing through the area of point 57 to deflect the liquid 26 inwardly toward the center of the apparatus.

The housing 1 is constructed of three parts in order to permit easy assembly and disassembly of the apparatus. The three housing parts consist of the center annular portion 58, which has more or less a triangular shaped cross-section configuration, and left and right housing ends 59 and 60, respectively, as viewed in FIG. 3. Housing sections 58, 59 and 60 are held together in a sealed relationship by means of machine screws 61 which are received in the threaded holes 62 annularly displaced about the mating machine sealing surface 63 of the central portion or section 58.

The three housing sections 58, 59 and 60, when united together in sealed engagement, provide two annular channels 28 to receive the centrifugally distributed liquid 26 therein for each deflection disc 50 and 51 respectively. In order to prevent confusion, however, the channels are numbered respectively 28' and 28''. The reason two such channels are provided as opposed to one channel 28 is that in the embodiment of the FIGS. 3 and 4, two discs are employed for deflection of the liquid 26 and it is thus obvious that it is desirable to have each disc come as close to the bottom of its respective channel 28 at the place of closest association, namely, point 57, without actually engaging the interior of the rotating housing. Accordingly, the interior of the housing 1 is constructed to very closely conform to the design of discs 50 and 51 so that they may function as efficiently as possible by deflecting as much of the liquid 26 as possible from within the channels 28' and 28'' inwardly between points 57 and 56. In other words, the channels 28' and 28'' are tailor contoured as much as possible to the deflection discs 50 and 51 within the area wherein they protrude into the channels respectively about point 57 to assure that as much of the fluid 26 as possible is deflected inwardly by the scooping action of the discs.

While deflection discs 50 and 51 in a nonrotating condition would be effective to deflect the liquid 26 inwardly as previously described along one portion thereof in channels 28' and 28'', which is selected relative to an outside reference, the reason for permitting them to free wheel in the direction indicated by arrows 64 in the same direction of the housing 1 which is indicated by arrow 20, is that this materially reduced the deflection friction encountered in a stationary deflector such as depicted in FIGS. 1 and 2. This is due to the fact that as each deflection disc 50 and 51 continually have annular perimetral portions thereof penetrating the liquid 26 which is annularly distributed by centrifugal force within channels 28' and 28'' respectively, they are moving continuously with the rotating liquid body thereby decreasing the frictional resistance between the penetrating edge of the deflectors 50 and 51 and the rotating liquid body 28' and 28'' which overall renders the apparatus more efficient than that disclosed in FIGS. 1 and 2.

In all other respects, the embodiment of FIGS. 3 and 4 functions identically to the embodiment of FIGS. 1 and 2, with the result that the unbalanced centrifugal force created by the deflector discs 50 and 51 penetrating into the mating contoured channels 28' and 28'' create a resultant thrust generally in the direction indicated by arrow 30 in FIG. 4, which would be approximately a thrust away from the viewer of FIG. 3.

As with the embodiment of FIGS. 1 and 2, the direction of unilateral thrust of the embodiment disclosed in FIGS. 3 and 4 may be varied by rotating shaft 8 as required to change the direction of travel of the apparatus as desired within a 360° possibility.

In both FIGS. 3 and 4, the liquid 26 is illustrated only in dashed outline form in order to prevent confusion in the FIGS. by covering up other portions of the structure with the liquid. However, the liquid 26 which is scooped up by the concave interior of deflection discs 50 and 51 is illustrated in FIG. 4 in positive form as centrifugally dislodging itself therefrom in the form of a spray as indicated at 32 similar to that shown in FIG. 2 in order to provide a more vivid image of how the apparatus functions.

The embodiment of FIGS. 3 and 4 is provided with substantially the same mechanism for turning shaft 8 for changing the direction of thrust of the overall apparatus wherein a ring gear 35 is meshed with a worm gear 36, which may be manipulated by handle or lever 37. It is, of course, obvious that this mechanism may be manipulated automatically by any suitable motor means which may, in turn, if desired, be operated through computerized control techniques.

As will be obvious to those of ordinary skill in the art, the continual frictional engagement between the deflection discs 50 and 51, for that matter between the deflector 13 and the liquid 26 in the structure of FIGS. 1 and 2, will create considerable heat, and particularly so where no atmosphere is encountered such as in space, due to the fact that the atmosphere is not present to assist in dissipating the heat thereby created and conducted through the walls of the housing 1 of the apparatus.

In this situation, it is desirable to continually withdraw, cool, and recirculate the working liquid 26. To accomplish this, the embodiment of FIGS. 3 and 4 is provided with a liquid recirculating system consisting of the withdrawal tube or line 70, which has pronged extensions 71 and 72 that extend downwardly into channels 28' and 28'' respectively, and have their openings exposed to the onward rushing fluid 26 such that a portion of the liquid 26 is forced into the withdrawal line 70 which passes on out through the right side of shaft 8 as indicated in FIG. 3, to a cooling unit (not shown), whereupon it is returned through return or refill line 73, seen at the left of FIG. 3 through the center of shaft 8, where it is permitted to exit as indicated at 74 back into annular channels 28' and 28''.

Rather than scooping up the liquid to be cooled by penetrating the withdrawal tubes 71 and 72 directly into the rotating body of fluid 26 as indicated in FIG. 4, the withdrawal tube 70 may also be situated such that it withdraws a portion of the fluid from the spray or stream of liquid 32 being thrown off of discs 50 and 51 as indicated at 70'.

Tubes 71, 72 and 73 may also be utilized to regulate the desired depth of liquid body 26.

While it is obvious that one deflection disc 50 or 51 may be employed without the use of the other to obtain the unbalanced centrifugal force required to drive the apparatus, it is always preferable to use two such deflection discs in opposition in order to balance the deflection forces so that additional unbalanced forces are not applied to the system which will unpredictably affect its travel characteristics.

In addition, it is desirable that the quantity of liquid 26 contained in annular channels 28' and 28'' be equal at all times in order to maintain the apparatus in a balanced condition of operation. This is accomplished by passages 65 which communicate the channels with each other so that the fluid body in both channels will seek a common level.

In addition, it is also desirable to employ the apparatus of the present invention such as disclosed in the embodiment of FIGS. 1 and 2 or in the embodiment of FIGS. 3 and 4 in duplicate, with the duplicate apparatus being rotated in a direction opposite that of the original and in close proximity thereto so that the torque effect imparted by each apparatus counteracts that of the other, thereby providing true unilateral motion. In this manner, the effects of torque may be ignored for all practical purposes.

Figure 5:
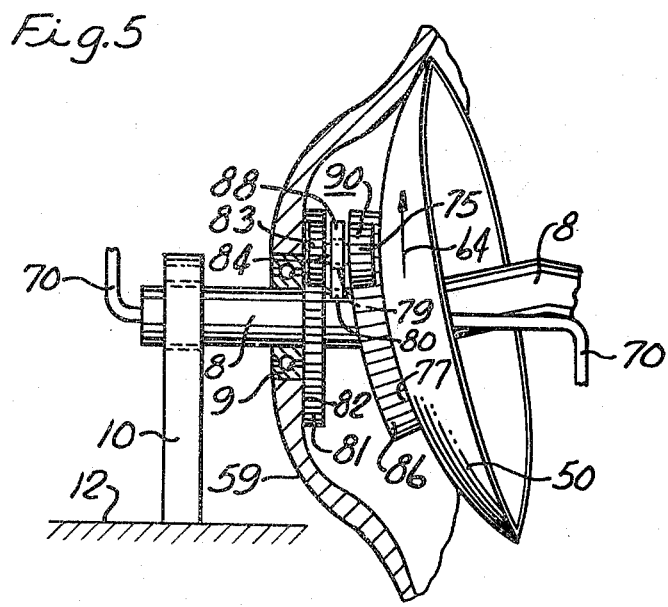
FIG. 5 is a simplified front view in partial section of the propulsion apparatus of the present invention similar to that illustrated in FIG. 3, and disclosing a gear power drive between the outer housing and inner deflection disc.

As opposed to permitting the deflection discs 50 and 51 to rotate freely about shaft 8 as disclosed in the embodiment of FIGS. 3 and 4, it may be desirable to positively drive the discs in order to further reduce the frictional engagement between the liquid being deflected and the deflection discs. One method of positively driving the discs 50 and 51 is illustrated in FIG. 5, wherein like elements are designated with the same reference numerals. The structure of FIG. 5 is, for all practical purposes, identical to that of FIGS. 3 and 4, with the exception that the discs 50 and 51 are positively driven through the rotation of housing 1 by means of the planetary gear train 90 which consists of a ring gear 81 which is rigidly secured to the inside wall of housing section 59 as indicated at 82, gear 83 which is meshed with gear 81, and secured to shaft 84, which is in turn rigidly and coaxially secured to gear 85 which is meshed with ring gear 86. Ring gear 86 is rigidly secured to disc 50 as indicated at 87, Shaft 84 which connects gears 83 and 85 for rotation, is rotatably received in block 88 with antifriction bearings 89. Block 88 is, in turn, rigidly secured to shaft 8 as indicated at 80.

Accordingly, when housing 1 rotates about shaft 8, gears 83 and 85 are also caused to rotate thereby causing ring gear 86 together with deflection disc 50 to rotate in the same direction as housing 1. The ratio of the gears may also obviously be selected to rotate disc 51 at the desired speed, which generally will be a speed which permits the inside of the housing 1 and the perimetral edge of the disc to rotate at the same rate at point 57, as indicated in FIG. 4. This accordingly insures minimal friction between the deflectors and the rotating liquid mass.

I claim:

1. A continous motion propulsion apparatus comprising a moveable frame, annular channel means rotatably carried by said frame in a plane perpendicular to its axis of rotation about its center, a body of liquid contained within said channel means, drive means operable to rotate said channel means about its axis and thereby centrifugally distribute said liquid annularly therein, and deflection means positioned in said channel means to deflect said liquid contained therein inwardly at a predetermined position relative to an outside reference to create an unbalanced centrifugal force and thereby propel the apparatus with continuous motion.

2. The continuous motion propulsion apparatus of claim 1 wherein said channel means comprises a closed housing with an annular channel supported for rotation on a shaft.

3. The continuous motion propulsion apparatus of claim 2 wherein said deflection means comprises a deflector secured to said shaft inside said housing with a leading edge of said reflector penetrating outwardly into said channel to deflect said liquid inwardly.

4. The continuous motion propulsion apparatus of claim 2 wherein said deflection means comprises an annular concave deflection disc rotatably mounted at its center on said shaft inside said housing, said shaft being shaped out of axial and parallel alignment with the axis of rotation of said housing where it rotatably supports said disc such that a perimetral portion of said disc penetrates said channel only at one position relative to said outside reference so as to deflect said liquid therein inwardly at said predetermined position.

5. The continuous motion propulsion apparatus of claim 2 wherein said shaft extends through said housing, said deflection means comprising two opposed annular concave deflection discs rotatably supported on said shaft with their axes of rotation being out of parallel and axial alignment with each other and the axis of said housing and perimetrally converging toward each other at one point fixed relative to said shaft, a perimetral portion of said discs penetrating said channel only at one position relative to said outside reference so as to deflect said liquid therein inwardly at said predetermined position.

6. The continuous motion propulsion apparatus of claim 5 characterized by second drive means connected to rotate said discs in the same direction as said housing at a predetermined speed.

7. The continuous motion propulsion apparatus of claim 6 wherein said second drive means comprises a gear train between said housing and said discs.

8. The continuous motion propulsion apparatus of claim 1 including recirculating means connected to continually withdraw and replenish said liquid.

9. The method of propelling an apparatus with continuous motion comprising the steps of centrifugally rotating a liquid within an annular housing to be moved, and deflecting the liquid inwardly from said annular housing at a predetermined position relative to an outside reference to unidirectionally propel the apparatus with continuous motion.

* * * * *